United States Patent [19]

Ollendorf et al.

[11] 4,088,406

[45] May 9, 1978

[54] METHOD OF PERFORMING CONTACTLESS PHOTOLITHOGRAPHY

[75] Inventors: Joel Ollendorf, West Orange; Frank J. Cestone, Flemington, both of N.J.

[73] Assignee: RCA Corporation, New York, N.Y.

[21] Appl. No.: 742,069

[22] Filed: Nov. 15, 1976

Related U.S. Application Data

[62] Division of Ser. No. 568,716, Apr. 16, 1975, Pat. No. 4,006,909.

[51] Int. Cl.$^2$ .............................................. G03B 27/02

[52] U.S. Cl. .................................................... 355/132

[58] Field of Search ................. 279/3; 355/18, 91, 73, 355/77, 78, 132, 133

[56] References Cited

U.S. PATENT DOCUMENTS 1,602,436 10/1926 Jones ..................................... 355/91

3,597,081 8/1971 Cason et al. ....................... 355/73 X 3,955,163 5/1976 Novak ................................ 355/132

OTHER PUBLICATIONS

I.B.M. Technical Disclosure Bulletin Vonkanel, vol. 6, No. 7, p. 61, 12/1963.

*Primary Examiner*—Donald Griffin

*Attorney, Agent, or Firm*—H. Christoffersen; T. H. Magee

[57] ABSTRACT

A semiconductor wafer vacuum chuck used as part of a photographic wafer-alignment machine for performing contactless photolithography has integral spacer means disposed on a substantially planar surface thereof for mechanically maintaining a fixed distance between portions of a wafer positioned adjacent the spacer means and the surface of the wafer chuck, whereby a controlled separation is provided between a surface of the wafer and a photographic mask overlying the surface of the wafer upon the application of a vacuum to the surface of the wafer chuck.

2 Claims, 5 Drawing Figures

METHOD OF PERFORMING CONTACTLESS PHOTOLITHOGRAPHY

This is a division, of application Ser. No. 568,716, filed Apr. 16, 1975 and now U.S. Pat. No. 4,006,909 issued Feb. 8, 1977.

This invention relates to a semiconductor wafer vacuum chuck used as a part of a photographic wafer-alignment machine for performing contactless photolithography.

In manufacturing certain types of semiconductor devices such as, for example, integrated circuit devices, elements in these devices are frequently formed by first etching patterns in layers of material disposed on the surface of a semiconductor substrate. Areas where etching is not desired are protected by a light-sensitive polymer commonly called a "photoresist". A protective layer of photoresist is formed by covering the entire surface of the layer to be etched with the light-sensitive photoresist, forming the desired pattern in the photoresist by exposing selected areas of the photoresist light, and then washing away those areas where etching is desired. This invention is related to the exposing step when the desired pattern is printed in the photoresist.

The printing process is usually performed by using a photographic mask having various opaque and transparent image areas formed therein to selectively allow light to pass through the mask onto the layer of photoresist. One well-known way to project the pattern of the photographic mask onto the photoresist layer is to place the mask in contact with the light-sensitive surface of the substrate. This is commonly referred to as "contact"printing.

A problem associated with such contact printing is that the surface of the substrate, typically a silicon wafer, is not perfectly flat, but generally exhibits a certain surface waviness and, in addition, contains a number of imperfections such as, for example, sharp and hard spikes, mounds, and dust particles. These imperfections can cause scratches to form in the opaque areas of the photographic mask and, after a relatively few uses of the mask, damage the mask to the point where it must be discarded. This is undesirable since the manufacture of photographic masks is relatively expensive and represents a significant factor in the total cost of fabricating semiconductor devices.

In order to prevent such scratching, a small fixed distance between the surface of the substrate and the photographic mask is maintained. Only a very small distance can be tolerated in order to avoid a significant deterioration of the geometrical or dimensional definition of the printed image; however, such a small distance can effectively reduce the abrasive wear of the photographic mask. Such printing is frequently referred to as "near-contact" printing, "proximity" printing, or "projection" printing. Various techniques have been proposed for providing a uniform and accurately controllable spacing between the photographic mask and the surface of the substrate, including attaching a plurality of raised spacers to a surface of the mask. However, such techniques, including the aforementioned one of attaching spacers to each individual mask, generally are excessively cumbersome or expensive.

Figure 1:
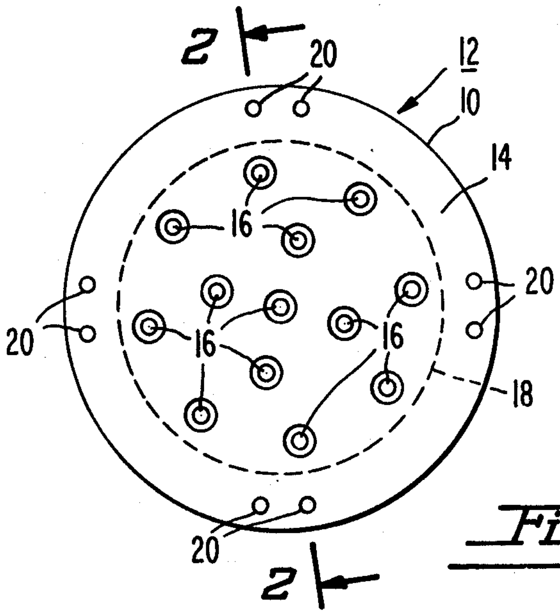
FIG. 1 is a plan view showing one embodiment of the present novel apparatus.
Figure 2:
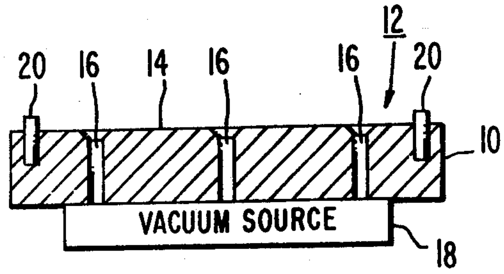
FIG. 2 is a cross-sectional view taken along line 2—2 of FIG. 1.

Referring to FIGS. 1 and 2 of the drawings, there is shown an element 10 of a semiconductor wafer vacuum chuck 12 which may be used as part of a photographic wafer-alignment machine for performing contactless photolithography. The element 10 has at least one substantially planar surface 14 for receiving a semiconductor wafer thereon and, typically, has a diameter similar in size to the diameter of the wafer to be received thereon. The wafer chuck 12 may also have means for applying a vacuum to the surface 14 of the element 10. Such means for applying a vacuum typically comprises a plurality of cylindrical holes 16 disposed in the element 10 which flare out at one end and perforate the substantially planar surface 14 and which are connected at the other end to a vacuum source diagrammatically indicated at 18. When a vacuum is continuously drawn through the holes 16 and thereby transmitted to the substantially planar surface 14, a semiconductor wafer positioned above the surface 14 is held on the element 10 by air pressure tending to draw the wafer in to the surface 14.

Disposed on the substantially planar surface 14 of the wafer-chuck element 10 is means for mechanically maintaining a fixed distance between first portions of a semiconductor wafer positioned adjacent the means and the surface 14 of the element 10, the means positioned to allow second portions of the wafer spaced from the means to be drawn towards the planar surface 14 upon the application of a vacuum to the surface 14 of the element 10. The purpose of maintaining this fixed distance is to elevate the first portions of the semiconductor wafer positioned adjacent the means above the second portions of the wafer upon the application of a vacuum to the substantially planar surface 14. Such elevated first portions may then contact and thereby support an overlying photographic mask at approximately this fixed distance above a surface of the wafer, whereby a controlled separation is provided between the surface of the wafer and the photographic mask. The means disposed on the substantially planar surface 14 comprises, preferably, an integral spacer structurally attached to the wafer-chuck element 10.

One embodiment of such a spacer may comprise a plurality of pins 20 disposed at intervals along the periphery of the substantially planar surface 14, as shown in FIGS. 1 and 2. The pins 20 are positioned so that they contact the peripheral area of the semiconductor wafer positioned adjacent thereto, thus avoiding contact with and thereby allowing the central area of the wafer to be drawn in towards the surface 14 of the element 10 upon the application of a vacuum thereto. Preferably, these pins 20 are made of stainless steel, have a diameter of approximately 0.03 inches and a height of approximately 0.0005 inches above the substantially planar surface 14. The wafer chuck 12 may be fabricated by drilling holes halfway through the element 10 at desired locations and then forcing stainless-steel dowels having appropriate-fitting diameters into these holes until the desired height is reached. Such pins 20 may also comprise integral extensions of the element 10 which are fabricated by known machining techniques.

Figure 3:
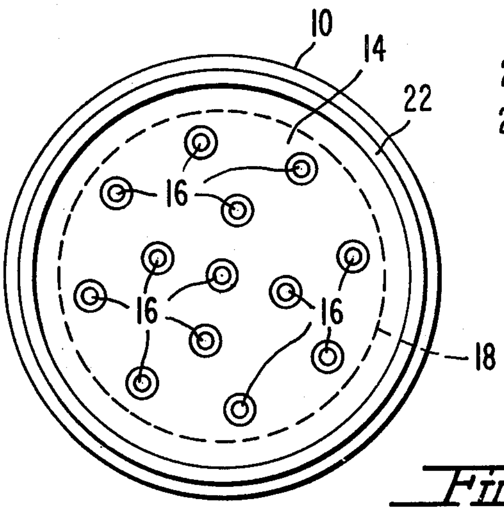
FIG. 3 is a plan view showing another embodiment of the present apparatus.

Referring to FIG. 3, there is illustrated another embodiment of such means for mechanically maintaining the fixed distance. In this embodiment, the spacer comprises a continuous ring 22 disposed along the periphery of the substantially planar surface 14 of the wafer-chuck element 10. This ring 22, which may also be made of stainless-steel, has dimensions similar to the dimensions of the aforementioned pins 20 and may be fabricated in a similar manner. Preferably, the ring 22 is an integral extension of the element 10 and is fabricated by known machining techniques.

Figure 4:
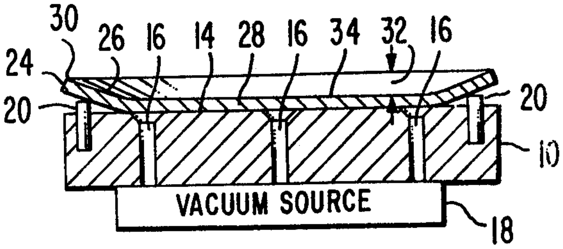
FIG. 4 is a cross-sectional view taken along line 2—2 of FIG. 1 together with a typical semiconductor wafer positioned above the present apparatus.

A method of performing contactless photography utilizing a semiconductor wafer vacuum chuck as described above comprises the following steps. Referring to FIG. 4, a semiconductor wafer such as, for example, a silicon wafer 24 is positioned above the substantially planar surface 14 of the wafer-chuck element 10. The wafer 24 typically has a diameter of approximately 2 to 3 inches (5 to 8 centimeters) and a thickness of about 10 to 20 mils (250 to 500 micrometers). The pins 20 maintain a fixed distance between first portions 26 of the wafer 24 adjacent the pins 20 and the surface 14 of the element 10. The first portions 26 of the wafer 24 comprise the peripheral portions thereof in the embodiment shown. A vacuum is continuously applied to the substantially planar surface 14 by activating the vacuum source 18. Such a vacuum source should have a negative pressure sufficient to cause second portions 28 of the wafer 24 spaced from the pins 20, i.e., the central portions thereof in the embodiment shown, to be drawn towards the surface 14 of the wafer-chuck element 10, as shown in FIG. 4. A vacuum pressure of approximately 45 centimeters of mercury (635 g/cm$^2$) is preferred. The amount of vacuum pressure applied to the substantially planar surface 14 will vary depending upon the spacer means disposed on the surface 14 of the element 10. A ring 22, due to its continuous structure, requires a relatively small vacuum, whereas a plurality of pins 20, due to the gaps therebetween, requires a relatively larger vacuum. Although silicon is commonly thought to be one of the more brittle solids, such a silicon wafer 24, upon being subjected to a vacuum under the aforementioned conditions, does actually flex a small degree. The pins 20 form projections or bumps on the surface 14 of the wafer-chuck element 10 which are thereby propagated through the silicon wafer 24 causing upper edge corners 30 of the wafer 24 to be elevated a fixed distance 32 above the upper central surface 34 of the wafer 24. When the second portions 28 are drawn in to the substantially planar surface 14 so that the second portions 28 of the wafer 24 conform substantially to the contour of the surface 14 of the wafer-chuck element 10, this fixed distance 32 is approximately equal to the height of the pins 20 above the substantially planar surface 14 since the pins 20 are positioned so that they contact the peripheral portions, i.e., the first portions 26 of the wafer 24.

Figure 5:
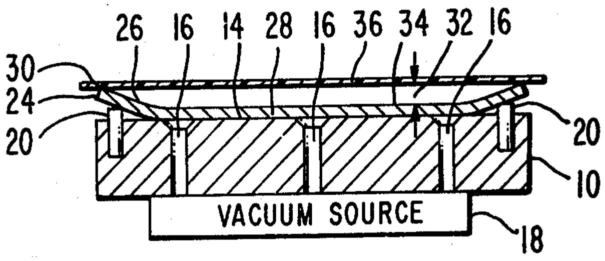
FIG. 5 is the same cross-sectional view shown in FIG. 4 along with a photographic mask disposed above the semiconductor wafer.

Referring to FIG. 5, 2 photographic mask 36 is next placed above and in contact with the upper edge corners 30 of the silicon wafer 24. Since the corners 30 are elevated at the fixed distance 32 above the upper central surface 34 of the wafer 24, these corners 30 thereby support the photographic mask 36 at approximately this fixed distance 32 above the central surface 34, whereby a controlled separation is provided between the mask 36 and the central surface 34. One of the desirable features necessarily incorporated into this invention is that the separation is fixed by the height of the pins 20 and is independent of the thickness of the wafer 24 in that the separation is controlled by having the elevation of the upper edge corners 30 proportionally dependent upon the thickness of the wafer 24, thus avoiding the relatively complex process of having to individually adjust an externally-located spacer in order to compensate for variations in thickness from one wafer to the next wafer. Contactless photolithography is thereby achieved as the only area of the mask 36 which contacts the silicon wafer 24 is the small peripheral area adjacent to the corners 30 of the wafer 24, which is of relatively little concern since the large central area of the mask 36, which does not contact the wafer 24 due to the controlled separation, contains the important opaque image areas used to project the desired pattern onto the photoresist layer. As a result, the abrasive wear of the photographic mask 36 is reduced, and scratches in the opaque areas caused by imperfections in the surface of the wafer are more easily prevented. Consequently, the lifetime of the mask 36 is significantly increased by the present invention, which avoids excessively cumbersome techniques such as attaching spacers to each individual mask, thereby achieving economies in production.

What is claimed is:

1. A method of performing contactless photolithography utilizing a photographic mask overlying a surface of a flexible semiconductor wafer comprising the steps of:

positioning said semiconductor wafer above a substantially planar surface of a wafer vacuum chuck having means for mechanically maintaining a fixed distance between first portions of said wafer adjacent said means and said surface of said vacuum chuck, said means positioned between said wafer and said chuck and extending from said chuck so as to cause said first portion of said wafer to be spaced above second portions of said wafer when vacuum is applied, applying a vacuum to said surface of said vacuum chuck sufficient in negative pressure to cause second portions of said wafer spaced from said means to be drawn towards said surface of said vacuum chuck, whereby said first portions are elevated above said second portions, and placing said photographic mask above and in contact with said first portions of said wafer, said first portions thereby supporting said photographic mask above said second portions whereby a controlled separation is provided between said surface of said wafer and said photographic mask.

2. A method as recited in claim 1 wherein said first portions of said wafer comprise peripheral portions thereof and said second portions comprise central portions thereof.

* * * * *